UNITED STATES PATENT OFFICE.

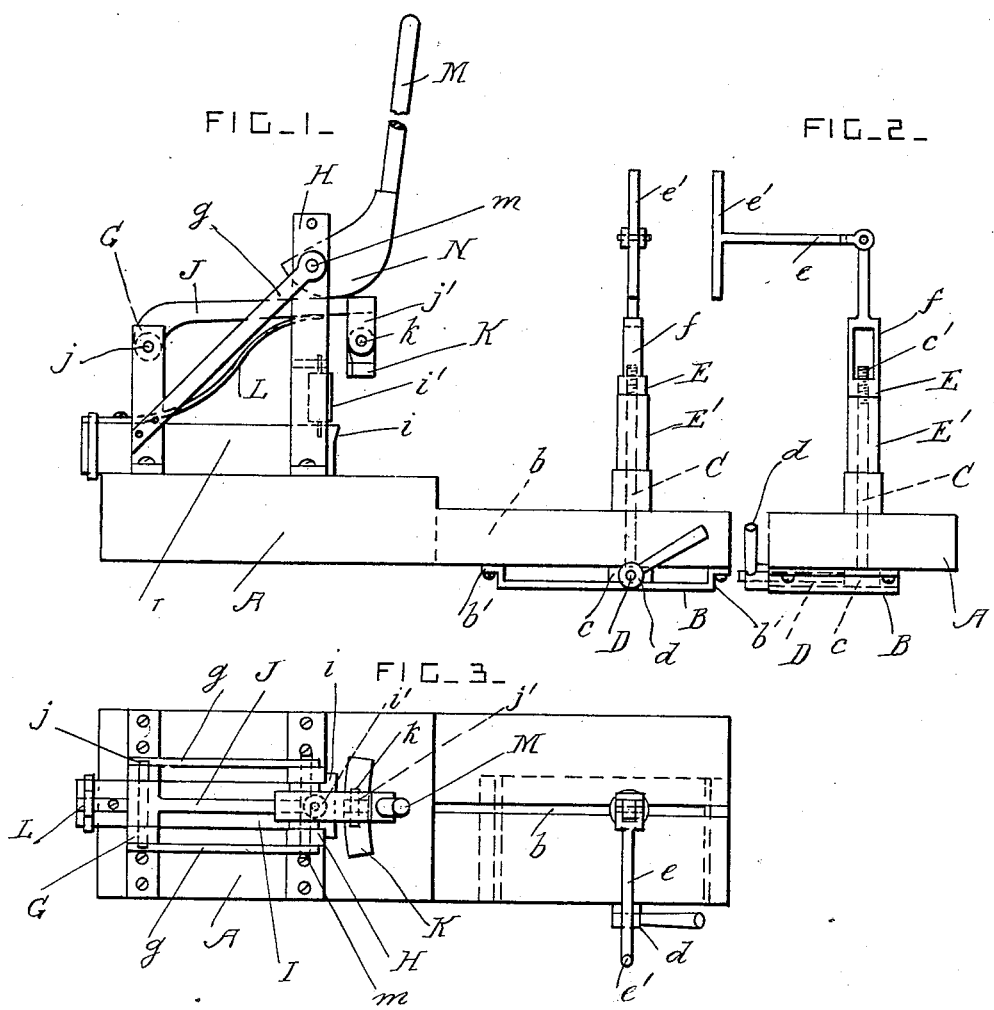

DANIEL McEACHERN, OF MESA, ARIZONA TERRITORY, ASSIGNOR OF ONE-HALF TO FRANK E. RICH, OF LOS ANGELES, CALIFORNIA.

TIRE-PRESS.

968,877.  Specification of Letters Patent.  Patented Aug. 30, 1910.

Application filed September 18, 1909. Serial No. 518,329.

*To all whom it may concern:*

Be it known that I, DANIEL McEACHERN, a citizen of the United States, residing at Mesa, in the county of Maricopa and Territory of Arizona, have invented certain new and useful Improvements in Tire-Presses; and I do hereby declare the following to be a full, clear, and exact description of the invention, such as will enable others skilled in the art to which it appertains to make and use the same.

This invention relates to devices for removing metallic tires from the rims of wheels; and it consists in the novel construction and combination of the parts hereinafter fully described and claimed.

In the drawings, Figure 1 is a side view of the tire press. Fig. 2 is an end view; and Fig. 3 is a plan view of the same.

A is a supporting base or table provided with a narrow longitudinal slot $b$.

B is a metallic plate or bracket which is secured to the underside of the base by means of feet $b'$ and suitable bolts or screws.

C is a vertical spindle which is slidable in the slot $b$, and which has a head $c$ at its lower end arranged between the base and the plate B and which rests on the said plate.

D is a bolt which projects from the head $c$ and which is provided with a screwthreaded end portion and a handle-nut $d$. When the nut $d$ is screwed up it secures the head $c$ in position and prevents the spindle C from sliding in the slot.

The upper end portion $c'$ of the spindle is screwthreaded and is provided with a nut E. The hub of the wheel is placed over a sleeve E′ which is slid onto the spindle C and which is secured by the nut E. The nut clamps the sleeve against the base, and also clamps the spindle to the base. This nut E is provided with a long jointed handle $e$ having a crosspiece $e'$ for revolving it, and the handle $e$ has a forked portion $f$ where it joins onto the nut so that it may clear the top of the spindle and enable the nut to be screwed against sleeves of different lengths to suit hubs of different size. The joint in the handle is provided so that its upper end portion can be folded over out of the path of the press lever.

G and H are two pairs of standards which are secured above one end portion of the base, and $g$ are diagonal braces secured to the lower part of the rear standards G and to the upper parts of the front standards H.

I is an abutment bar which is secured edgewise between the standards G and H, and one end $i$ of which projects in front of the standards H. A guide roller $i'$ is journaled between the front portions of the standards H above the end portion $i$ of the bar, and the periphery of this guide roller projects slightly from between the standards. When the wheel is mounted on the sleeve E′, the metallic tire is arranged to rest on the end portion $i$ of the bar I and to bear against the guide roller $i'$.

J is an arm one end of which is pivoted by a pin $j$ to the upper parts of the rear standards G. The other end of this arm slides vertically between the upper portions of the standards H which form a guide for it, and the arm is provided with a downwardly projecting double-eye $j'$ at its free end.

K is a shoe which is pivoted in the jaw of the double-eye, and which is arranged in contact with the bottom of the slot of the double-eye. This shoe is retained in position by a pivot pin $k$ which permits it to rock freely.

L is a spring secured to the bar I, and which normally holds the arm K in a raised position.

M is a lever for operating the press. This lever is pivoted on a pin $m$ between the front standards H, and it is provided with a cam N which bears on the arm J over the shoe K.

The metallic tire is first heated so as to expand it, and the shoe is forced downward against the rim inside the tire by means of the lever M so that the rim is pressed downwardly out of engagement with the tire. The wheel is turned around as required so that the pressure may be applied to its rim at different points.

What I claim is:

1. The combination, with a base for supporting a wheel, of standards arranged in pairs and secured to the base, an abutment bar secured edgewise between the pairs of standards with one end portion projecting from the front standards and forming a rest for the tire, a roller for the face of the tire to run against arranged between the front standards over the said bar, an arm pivoted to the rear standards and guided by the front standards, a shoe pivotally connected to the free end portion of the said arm, and an operating-lever provided with a cam which bears on the said arm, said lever being pivoted to the front standards.

2. The combination, with a base provided with a longitudinal slot, of a plate secured to the base below the slot, a spindle slidable in the slot and provided with a head which rests on the said plate, a bolt which projects from the said head between the said plate and base and which has a clamping-nut on its free end portion, a sleeve for the wheel hub engaging with the said spindle, a clamping-nut engaging with the upper part of the spindle and securing the sleeve in place, an abutment bar secured to the said base and forming a rest for the tire, and pressing mechanism arranged over the said bar and adapted to press the wheel rim out of engagement with the tire.

3. The combination, with a base provided with a longitudinal slot, of a plate secured to the base below the slot, a spindle slidable in the slot and provided with a head which rests on the said plate, a bolt which projects from the said head between the said plate and base and which has a clamping-nut on its free end portion and at one side of the base, an abutment secured to the said base at one end of its slot and adapted to support the tire when the wheel is mounted on the said spindle, and pressing mechanism for forcing the wheel-rim out of engagement with the tire.

4. The combination, with a base for supporting a wheel, of standards arranged in pairs and secured to the said base, an abutment-bar resting edgewise on the said base between the said standards with one end portion projecting from between the front standards, a roller for the face of the tire to run against journaled between the front standards, and lever mechanism for pressing the wheel rim downwardly when its tire is resting on the projecting end portion of the abutment-bar.

In testimony whereof I have affixed my signature in the presence of two witnesses.

DANIEL McEACHERN.

Witnesses:
E. BLEWETT,
C. E. CANNON.